United States Patent
Ojala (10) Patent No.: US 9,313,610 B2
(45) Date of Patent: Apr. 12, 2016

(54) ON DEMAND CUSTOMIZATION OF MOBILE COMPUTING DEVICES

(71) Applicant: Intel Corporation, Santa Clara, CA (US)

(72) Inventor: Rami Ojala, Tampere (FI)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,565

(22) Filed: Mar. 28, 2014

(65) Prior Publication Data

US 2015/0281873 A1 Oct. 1, 2015

(51) Int. Cl.
*H04B 7/00* (2006.01)
*H04W 4/00* (2009.01)
*H04W 8/24* (2009.01)

(52) U.S. Cl.
CPC .............. *H04W 4/008* (2013.01); *H04W 8/245* (2013.01)

(58) Field of Classification Search
CPC ........ H04B 5/02; H04W 84/18; H04W 88/06; H04W 4/008; H04W 8/245; H04M 1/7253
USPC ....................................... 455/41.1, 41.2, 573
See application file for complete search history.

(56) References Cited

U.S. PATENT DOCUMENTS

| | | | | |
|---|---|---|---|---|
| 2007/0294688 A1* | 12/2007 | Motoki | ...................... | G06F 8/60 717/178 |
| 2011/0254687 A1* | 10/2011 | Arponen | ........... | H04M 1/72525 340/540 |
| 2012/0028577 A1* | 2/2012 | Rodriguez | ....... | H04N 21/44008 455/41.1 |
| 2013/0084800 A1* | 4/2013 | Troberg | ............... | H04B 5/0037 455/41.1 |
| 2014/0113549 A1* | 4/2014 | Beg | ........................ | H04W 4/008 455/41.1 |
| 2014/0154975 A1* | 6/2014 | Lambert | ............... | H04W 4/008 455/41.1 |

* cited by examiner

*Primary Examiner* — April G Gonzales
(74) *Attorney, Agent, or Firm* — Blakely, Sokoloff, Taylor & Zafman LLP (57) ABSTRACT

Embodiments of the invention describe mobile computing device configuration processes. A device executing configuration logic may wirelessly transmit power to a mobile computing device housed within a sealed product packaging to charge a battery power supply of the mobile computing device. A short-range wireless communication link is established with the mobile computing device housed within the sealed product packaging to install a firmware image on the mobile computing device, wherein the firmware image is to be selected based, at least in part, on a geographic location of the mobile computing device. The short-range wireless communication link is then used to activate a wireless network interface of the mobile computing device housed within the sealed product packaging to connect to a boot server including an OS image for the mobile computing device to download and install.

19 Claims, 7 Drawing Sheets

ON DEMAND CUSTOMIZATION OF MOBILE COMPUTING DEVICES

FIELD

Embodiments of the present invention generally pertain to computing devices and more specifically to mobile computing devices.

BACKGROUND

Computing devices, such as mobile computing devices, may be configured to execute different applications or operating systems; thus, even though devices may have the same underlying hardware, their respective applications and/or operating systems need to be customized and installed prior to their shipment. Furthermore, language specific user software and interfaces for computing devices are installed prior to their shipment. The challenge of this process is that a device manufacturer needs to estimate how many devices with certain software configurations are needed at the production phase. If these estimates are inaccurate, they may create a shortage or a surplus of devices with certain configurations.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe apparatuses, systems and methods for on demand customization of mobile computing devices. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
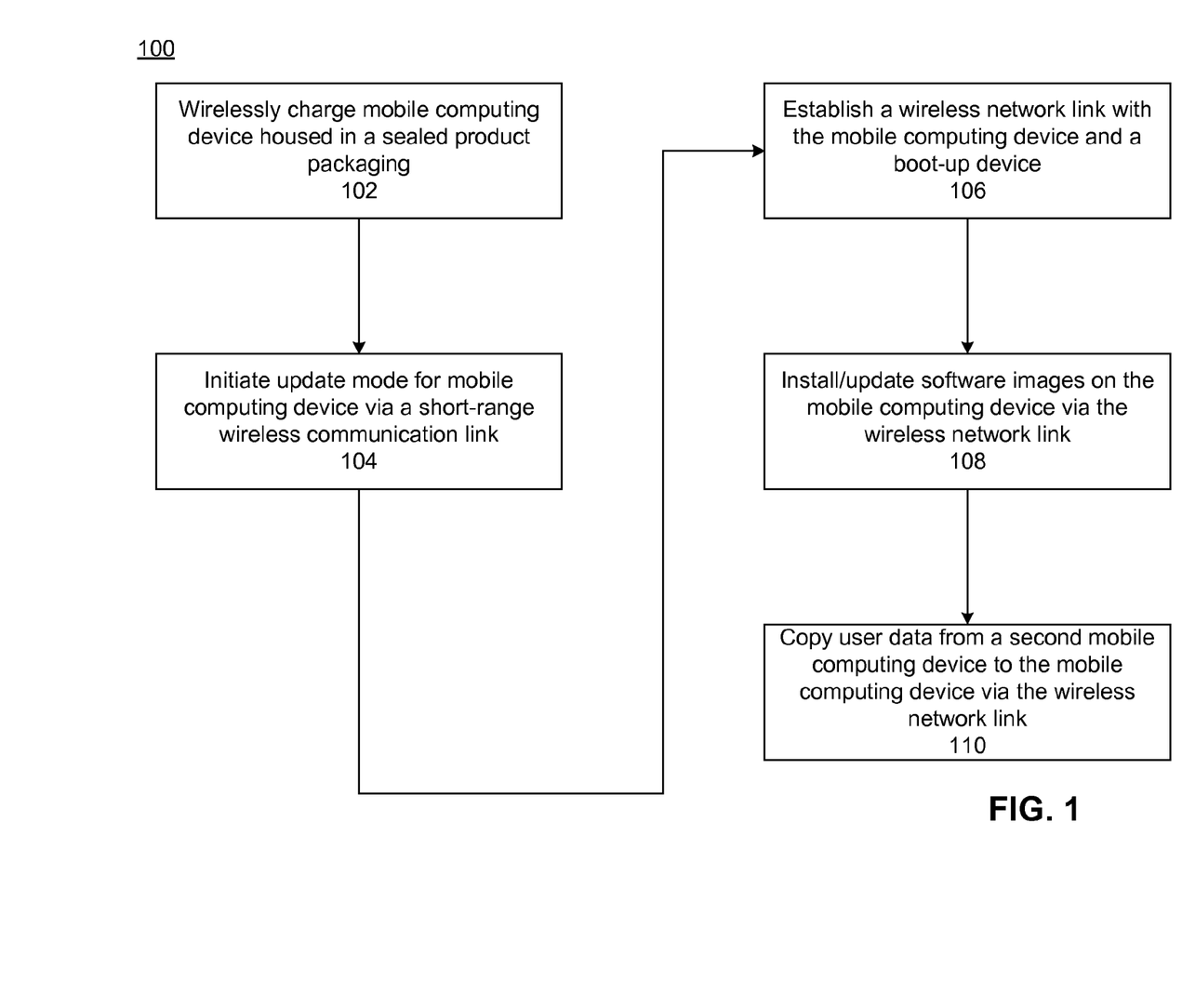
FIG. 1 is a flow diagram of a process for configuring a mobile computing device according to an embodiment of the invention.

FIG. 1 is a flow diagram of a process for configuring a mobile computing device according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 100 is shown to include operations to wireless charge a battery supply of a mobile computing device housed in a sealed product packaging (i.e., retail packaging), 102. Wirelessly charging the battery of the mobile computing device enables the device to be activated without coupling a power cable to the device, thereby enabling the device to remain in its sealed product packaging. Said battery of the mobile computing device may be wirelessly charged by any known means (e.g., inductively charged via a generated electromagnetic field from an external power supply, as illustrated and described below).

Once the battery supply is sufficiently charged, a short range wireless communication link is established initiating an update mode for the mobile computing device, 104. This short range wireless communication link may comprise a Near Field Communication (NFC) link, a Bluetooth link, or any equivalent short range wireless communication link for transferring data. In one embodiment, said update mode is executed for installing a firmware image on the mobile computing device, 104. Said firmware image is utilized for activating the mobile computing device, and for configuring a subsequent operating system (OS) installation or update. For mobile computing devices comprising cellular connectivity, said firmware may also include operations specific to a cellular service provider.

A wireless network connection is configured for the mobile computing device and a boot-up device, which is used to install software images, 106, such as an OS image. Said OS image may be stored on a boot-up device such as a boot server. The appropriate OS vendor and language for the OS image may be identified by the previously downloaded firmware image, or may be identified by a user interface of a software installation package.

Software images are installed and/or updated on the mobile computing device via the wireless network link, 108. For example, a complete OS image may downloaded and installed on the mobile computing device. In some embodiments, OS update patches are installed so that the mobile computing device has the most up-to-date version of the OS. Applications to be executed via the OS may also be installed.

Thus, in embodiments of the invention, mobile computing devices may be shipped from the manufacturer with minimal (if any) software installed, so that the devices may be customized at the distribution level, the retail level, etc.; in other words, instead of packaging different types devices, wherein the devices differ in software/firmware only, customization is done after the device is shipped. Embodiments of the invention therefore allow for the optimization of factory, logistics and device inventory storage operations.

Another benefit of customizing mobile computing devices after the manufacture phase is that it is possible to customize the mobile computing device for the eventual user. In this embodiment, user data from a second mobile computing device is copied to the packaged mobile computing device, 110. Thus, at a retail location for example, it is possible to transfer data and settings from a user's current device to a new device sealed in its retail packaging.

Figure 2A:
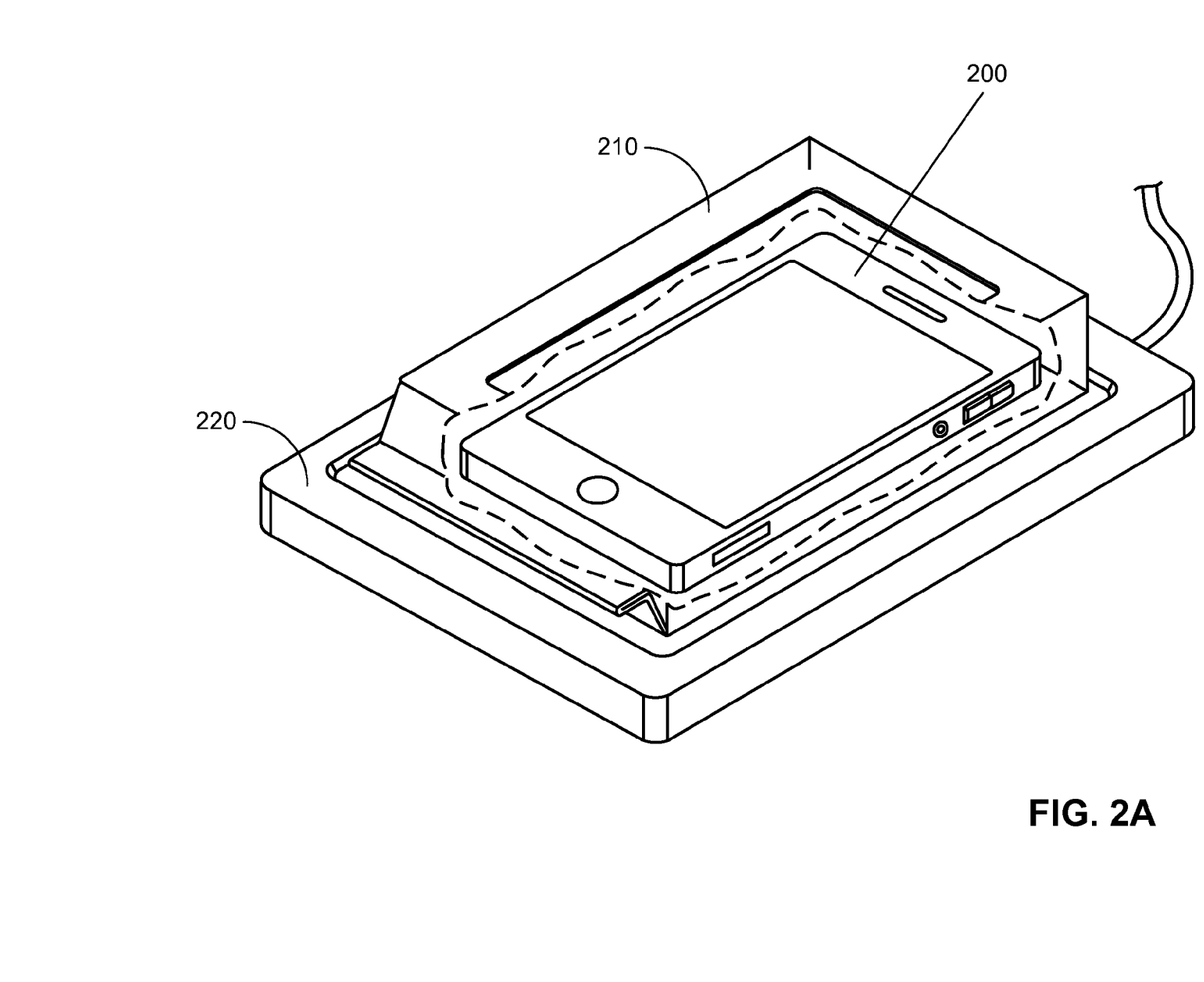
FIG. 2A and FIG. 2B are illustrations of a mobile computing device included in a sealed product packaging to be configured according to an embodiment of the invention.
Figure 2B:
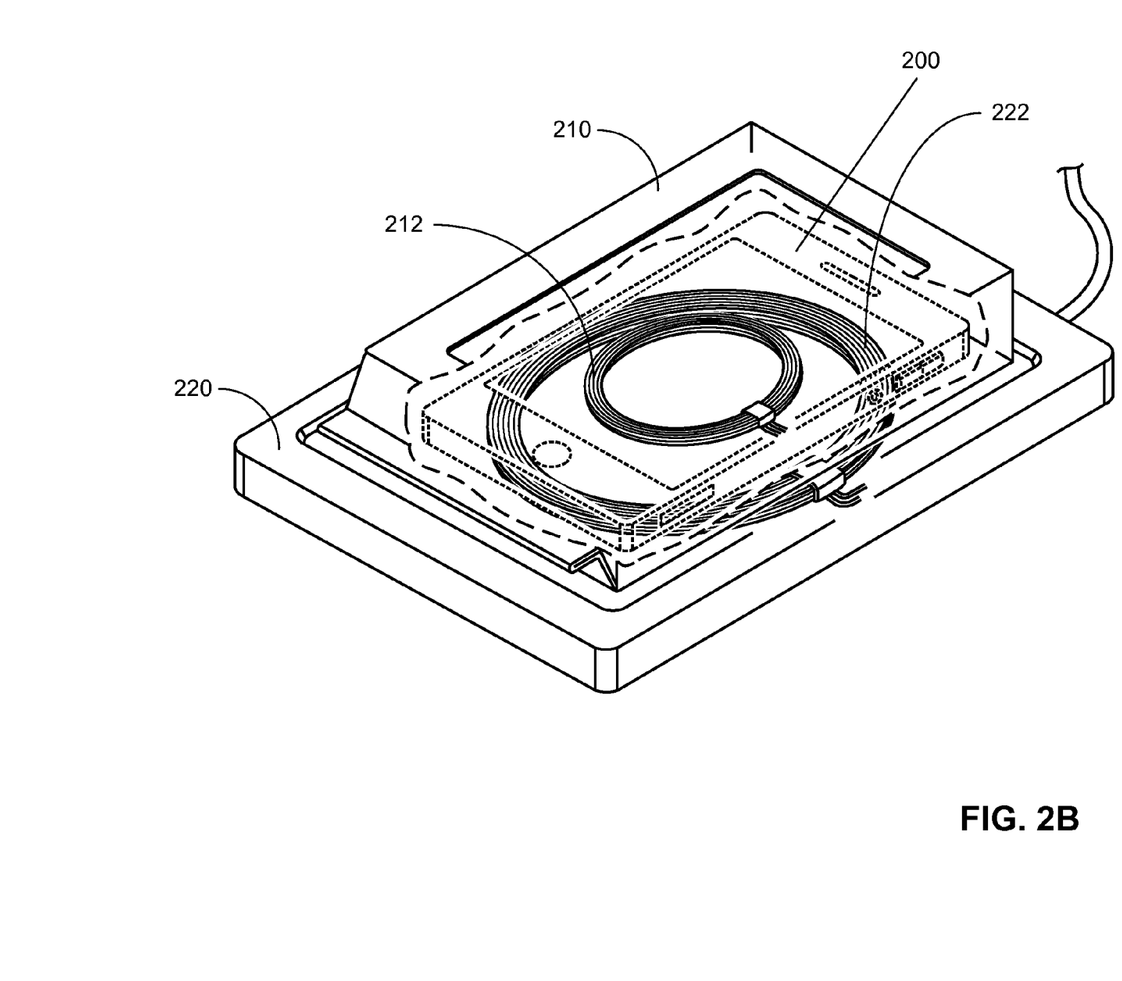

FIG. 2A and FIG. 2B are illustrations of a mobile computing device included in a sealed product packaging to be configured according to an embodiment of the invention. In this embodiment, mobile computing device 200 is illustrated as being included in sealed product packaging 210 (the illustration of device 200 of FIG. 2A is a cutaway view, as the device is enclosed in the sealed product packaging). Mobile computing device 200 is shown to comprise a smartphone, but in other embodiments, said mobile computing device may comprise any mobile device, such as a laptop computer, tablet computing device, wearable computing device, etc.

Mobile computing device 200, housed in packaging 210, is placed on wireless charging mat 220 to charge a battery power supply of the mobile computing device. When mobile computing device 200 is placed in packaging 210, it is in a power off state; wirelessly charging the battery power supply of the mobile computing device makes it possible to start the device without utilizing a physical connection, thereby enabling packaging 210 to remain sealed.

While any known wireless charging means may be used, FIG. 2B illustrates that wireless charging mat 220 includes coil 222 to generate a magnetic field for transmitting power. Coil 212 is shown to be included in packaging 210 to be charged inductively from the magnetic field generated by coil 222 of wireless charging mat 220. The placement of coil 212 within packaging 210 may vary, as long it is placed towards the expected location of the corresponding charging coil (i.e., in this embodiment, coil 222). In some embodiments, coil 212 is included in mobile computing device 200 (e.g., the coil may comprise a printed circuit board (PCB) coil). In other embodiments, coil 212 is included a housing separate from mobile computing device 200, and is electrically coupled to the battery power supply of the device. Characteristics of coils 212 and 222, such as wire size, wire material, size and shape of the coils, etc., may vary in other embodiments.

Figure 3:
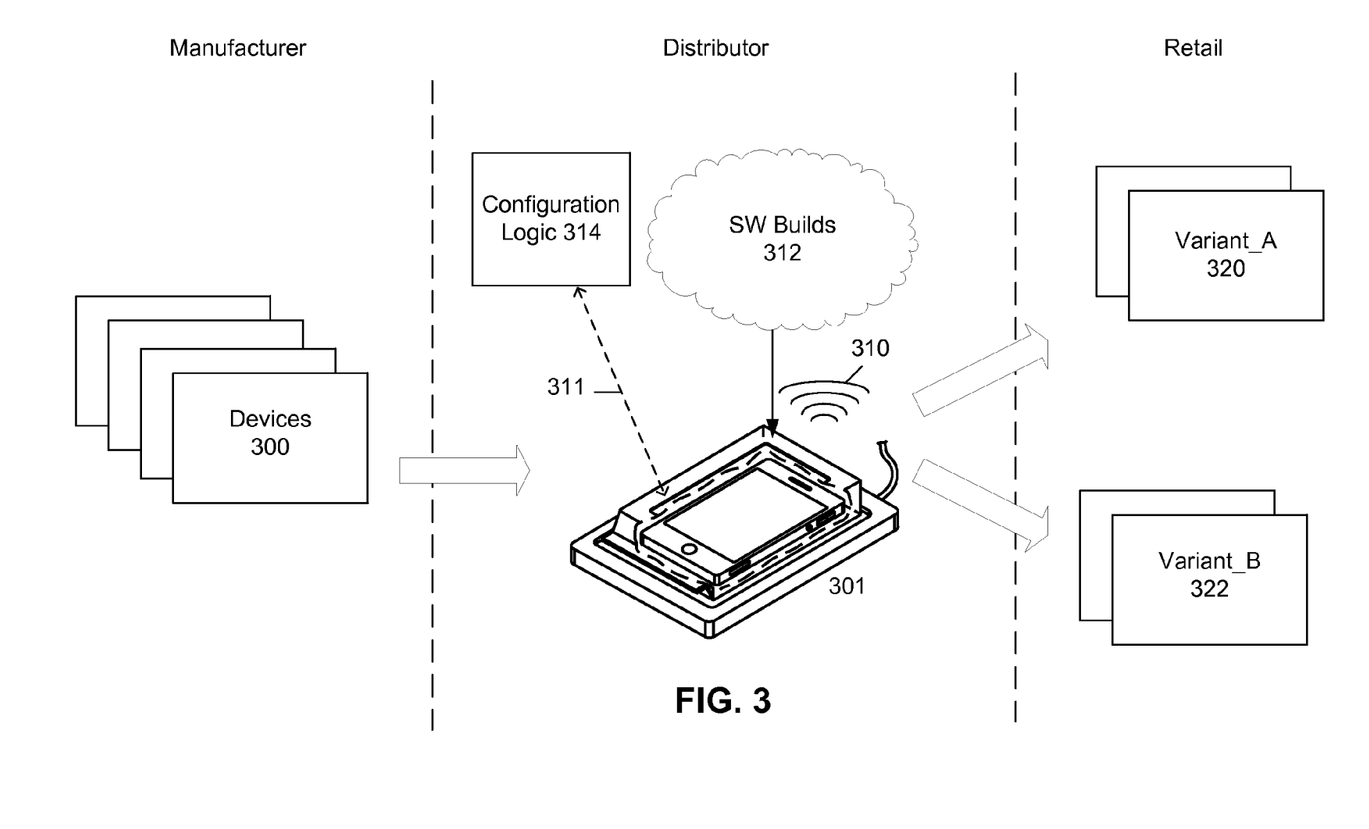
FIG. 3 is an illustration of a mobile computing device configuration and distribution process according to an embodiment of the invention.

FIG. 3 is an illustration of a mobile computing device configuration and distribution process according to an embodiment of the invention. In this embodiment, plurality of devices 300 are shown to be shipped from the manufacturer to one or more distributors. As described above, each of devices 300 are shipped from the manufacturer in a sealed packaging with minimal software installed.

At the distribution level, devices (such as device 301) are wirelessly charged and individually loaded with software; this software is selected based on several factors—e.g., destination region, retailer, intended service provider, etc. As described above, short range wireless link 311, e.g., an NFC link, is used to securely identify a startup mode for device initialization. NFC communication may be used by configuration logic 314 to transmit data connection details to device 301, e.g. the identify of Wi-Fi access point (AP) 310 and its security information. Said logic may comprise, for example, a general purpose processor executing application code, hardware circuitry integrated into a system on a chip, a dedicated system processor running firmware, an ASIC, etc.

Device 301 then connects to one or more network services that include software builds 312—i.e., different OS and software variants. While one device is shown in this example, other embodiments may install OS and application software for several devices at once. For example, in one embodiment, different Wi-Fi networks are utilized for different OS variants.

In this example, a plurality of OS variants are installed on subsets of plurality of devices 300. Subsets 320 and 322 are shown to include different OS variants. Thus, plurality of devices 300 are shipped from the manufacture comprising the same underlying hardware and minimal installed software. Each of these devices is customized at the distribution level, without opening their respective sealed product packaging to allow for the optimization of factory, logistics and device inventory storage operations.

Figure 4:
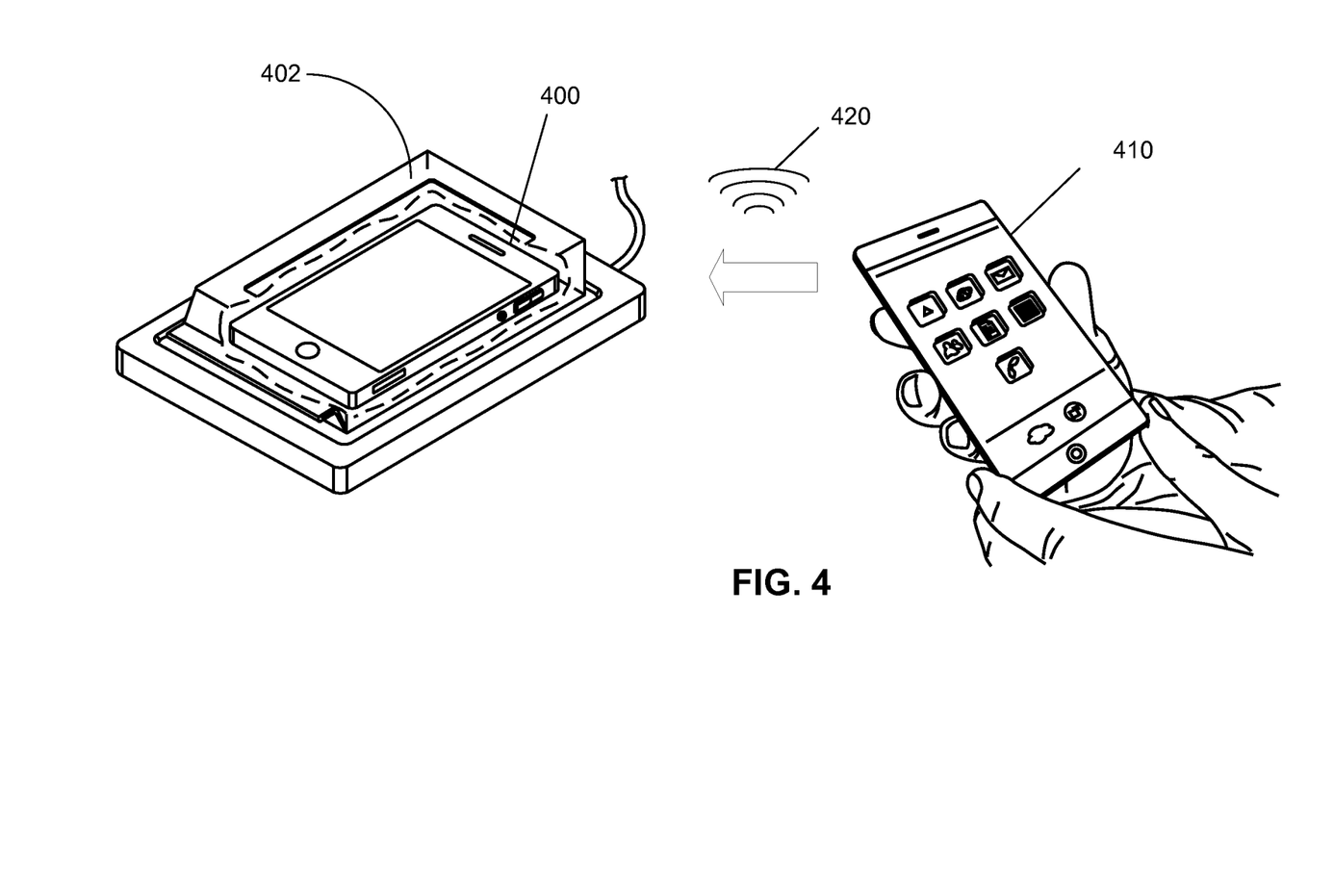
FIG. 4 is an illustration of a mobile computing device configuration operation according to an embodiment of the invention.

FIG. 4 is an illustration of a mobile computing device configuration operation according to an embodiment of the invention. In this embodiment, device 400, included in sealed product packaging 402, is shown to utilize Wi-Fi AP 420 for receiving user data from user device 410. This user data may include, for example, device and application configurations (e.g., user Wi-Fi AP settings, user email accounts, user application login data, device home screen settings, etc.) and user data (e.g., photos, videos, web browsing data, etc.). Thus, device 400 is customized according to the user (i.e., user device 420) at the point of purchase (i.e., the retail location for the device) without having sealed product packaging 402 opened.

Figure 5:
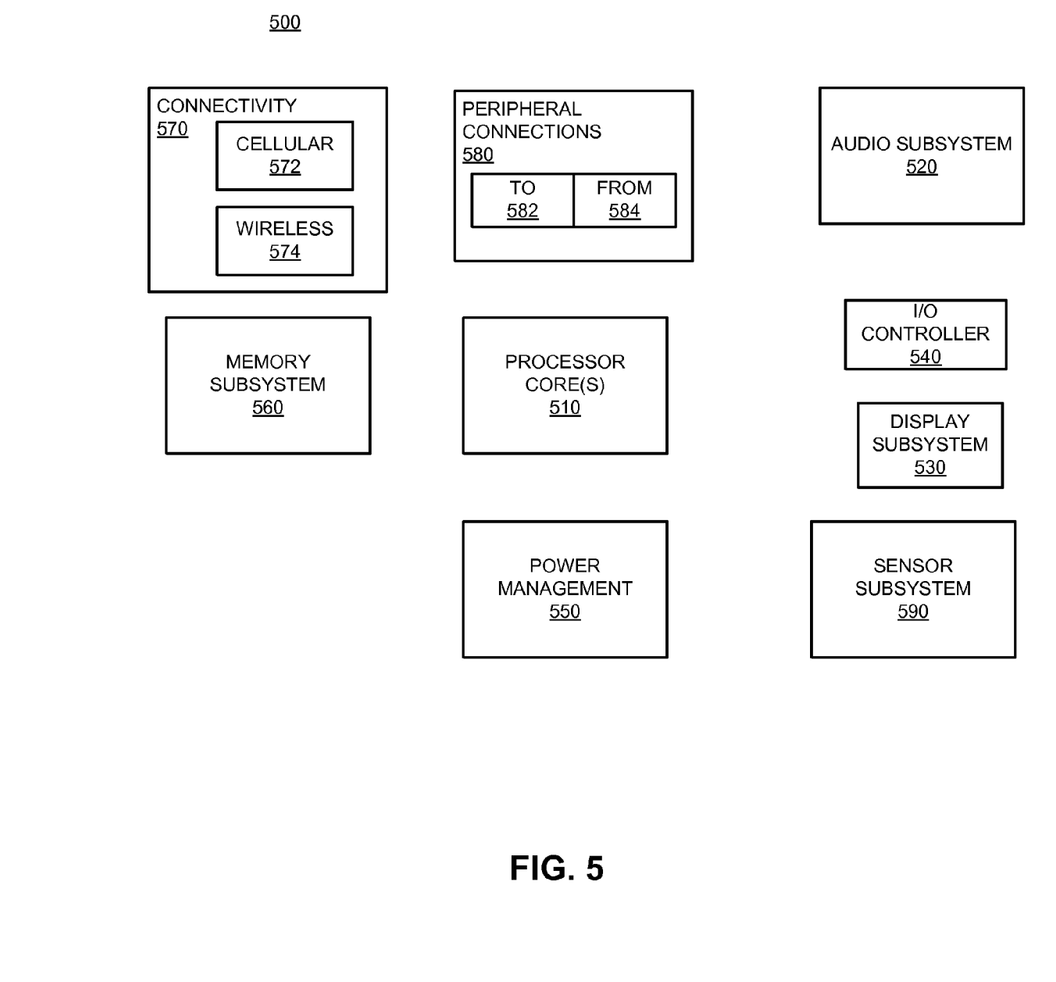
FIG. 5 is a block diagram of computing components to execute mobile computing device configuration processes to an embodiment of the invention.

FIG. 5 is a block diagram of computing components to execute mobile computing device configuration processes to an embodiment of the invention. Device 500 may comprise either a mobile computing device included in a sealed product packaging as described above, or may comprise a device including mobile computing device configuration logic to execute the configuration processes described above. It will be understood that certain of the components are shown generally, and not all components of such a device are shown in device 500. Furthermore, it will be understood that any of the illustrated components may be discrete components or may be components included on a system on a chip (SoC) integrated circuit (IC), and may be communicatively coupled through any direct or indirect means.

Device 500 includes one or more processor cores 510, which performs the primary processing operations of device 500. Each of processor core(s) 510 can be SoC components, or can be included in one or more physical devices, such as single or multi-core microprocessors, application processors, microcontrollers, programmable logic devices, or other processing means. The processing operations performed by processor core(s) 510 include the execution of an operating platform or operating system on which applications and/or device functions are executed. The processing operations include operations related to I/O (input/output) with a human user or with other devices, operations related to power management, and/or operations related to connecting device 500 to another device. The processing operations may also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 500, or connected to device 500. In one embodiment, a user interacts with device 500 by providing audio commands that are received and processed by processor core(s) 510.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. Display subsystem 530 includes a touchscreen, and thus the display device also acts as an input device, which can be at least partially managed by I/O controller 540. There can also be additional buttons or switches on device 500 to provide I/O functions managed by I/O controller 540. Sensor subsystem 590 may comprise any touch sensor (e.g., touch sensors in addition to the touchscreen of display subsystem 530) and/or motion detectors.

In one embodiment, I/O controller 540 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features). In one embodiment, device 500 includes power management 550 that manages battery power usage, charging of the battery, and features related to power saving operation.

Memory subsystem 560 includes memory devices for storing information in device 500. Memory can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500. Memory 560 further stores firmware images related to boot path operations, and thus may include DRAM devices to store said firmware images as described above.

Connectivity 570 includes hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards (e.g., UMTS, EV-DO, WiMAX, or LTE). Wireless connectivity 574 refers to wireless connectivity that is not cellular, and can include NFC communication links, personal area networks (such as Bluetooth), local area networks (such as Wi-Fi), and/or wide area networks (such as Wi-Max), or other wireless communication.

Peripheral connections 580 include hardware interfaces and connectors for implementing non-flash firmware storage support as described above, as well as software components (e.g., drivers, protocol stacks) to make peripheral connections. It will be understood that device 500 could both be a peripheral device ("to" 582) to other computing devices, as well as have peripheral devices ("from" 584) connected to it.

Device 500 may have a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audio-visual or other systems. In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), Display-Port including MiniDisplayPort (MDP), High Definition Multimedia Interface (HDMI), Firewire, or other type.

Figure 6:
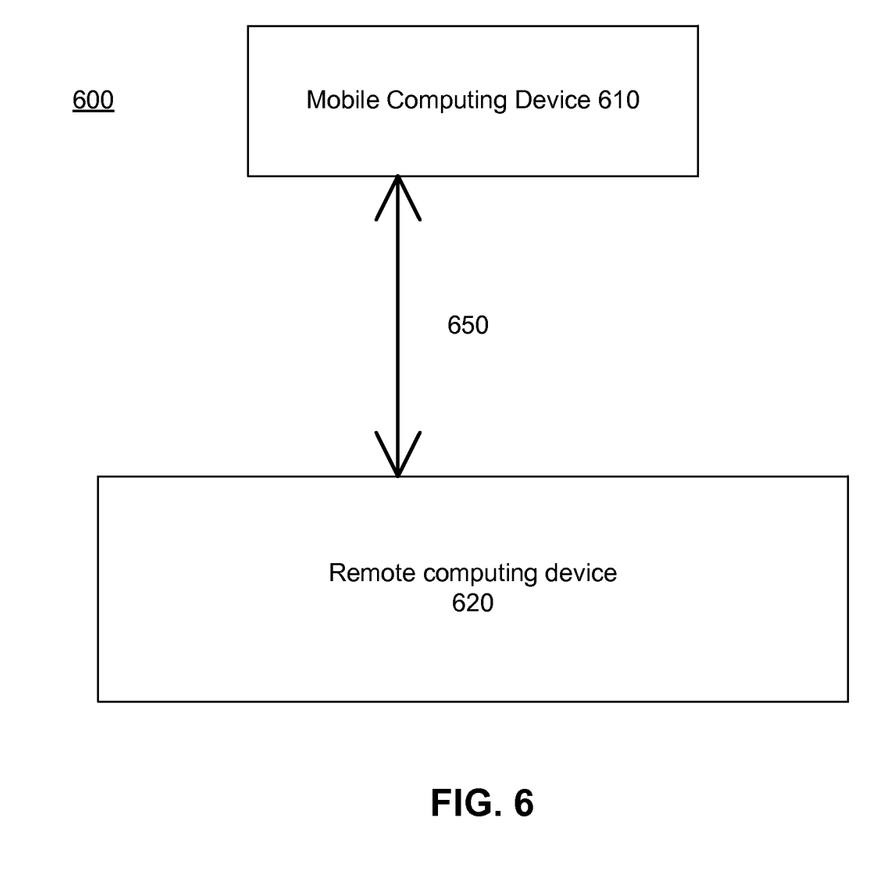
FIG. 6 illustrates a mobile computing device communicatively coupled to a remote device according to an embodiment of the invention.

FIG. 6 illustrates a mobile computing device communicatively coupled to a remote device according to an embodiment of the invention. System 600 includes mobile computing device 610 and remote device 620 communicatively coupled via communication link 650. Link 650 may comprise a short range wireless connection or wireless network connection.

Mobile computing device 610 may comprise any of the described or inferred embodiments discussed above, such as a laptop computer, a smartphone, a tablet computing device, or a wearable computing device. Remote device 620 may exchange data with device 610 via link 650.

Remote device 620 may comprise any type of computing device or transmitter suitable for executing the mobile computing device configuration operations discussed above including a laptop computer, a desktop computer, a server, etc. Remote device 620 and device 610 may each contain hardware to enable communication link 650, such as processors, transmitters, receivers, antennas, etc.

Various components referred to above as processes, servers, or tools described herein may be a means for performing the functions described. Each component described herein includes software or hardware, or a combination of these. Each and all components may be implemented as logic such as software modules, hardware modules, special-purpose hardware (e.g., application specific hardware, ASICs, DSPs, etc.), embedded controllers, hardwired circuitry, hardware logic (e.g., a general purpose processor executing application code, hardware circuitry integrated into an SoC, a dedicated system processor running firmware, an ASIC, etc.), etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

Embodiments of the invention describe apparatuses comprising logic, at least partially implemented in hardware (e.g., a general purpose processor executing application code, hardware circuitry integrated into an SoC, dedicated system processor running firmware, an ASIC, etc.). Said logic is to wirelessly transmit power to a mobile computing device housed within a sealed product packaging to charge a battery power supply of the mobile computing device, establish a short-range wireless communication link with the mobile computing device housed within the sealed product packaging to install a firmware image on the mobile computing device, wherein the firmware image is to be selected based, at least in part, on a geographic location of the mobile computing device, and use the short-range wireless communication link to activate a wireless network interface of the mobile computing device housed within the sealed product packaging to connect to a boot server including an operating system (OS) image for the mobile computing device to download and install.

In some embodiments, this logic is to further copy user data from a second mobile computing device to the mobile computing device housed within the sealed product packaging via the wireless network link. In some embodiments, the logic is to further select one of a plurality of OS images based, at least in part, on the geographic location of the mobile computing device. In some of these embodiments, the OS image is selected based on a language related to the geographic location of the mobile computing device, and/or is selected based on a vendor identity associated with the geographic location of the mobile computing device.

In some embodiments, the logic is to connect to a server including an OS update patch for the mobile computing device to download and install. In some embodiments, the short-range wireless communication link comprises a Near Field Communication (NFC) link and/or a Bluetooth communication link. In some embodiments, the mobile computing device comprises at least one of a smartphone, a tablet computing device, or a wearable computing device.

Embodiments of the invention describe a system including a processor, a memory, a wireless charging transmitter to wirelessly transmit power to a mobile computing device housed within a sealed product packaging to charge a battery power supply of the mobile computing device, a short-range wireless communication interface to establish a short-range wireless communication link with the mobile computing device housed within the sealed product packaging, and mobile computing device configuration logic. This logic is to install a firmware image on the mobile computing device, the firmware image stored in the memory, and use the short-range wireless communication link to activate a wireless network interface of the mobile computing device housed within the sealed product packaging to connect to a boot server including an operating system (OS) image for the mobile computing device to download and install.

In some embodiments, the mobile computing device configuration logic is to further configure the mobile computing device to copy user data from a second mobile computing device via the wireless network link. In some embodiments, the mobile computing device configuration logic is to further select one of a plurality of OS images based, at least in part, on a geographic location of the mobile computing device. In some of these embodiments, the OS image is selected based on a language related to the geographic location of the mobile computing device, and/or is selected based on a vendor identity associated with the geographic location of the mobile computing device.

In some embodiments, the mobile computing device configuration logic is to further configure the mobile computing device to connect to a server including an OS update patch for the mobile computing device to download and install. In some embodiments, the short-range wireless communication interface comprises a Near Field Communication (NFC) interface and/or a Bluetooth communication interface. In some embodiments, the mobile computing device to comprise at least one of a smartphone, a tablet computing device, or a wearable computing device.

Embodiments of the invention describe a least one computer readable storage medium having instructions stored thereon that, when executed on at least one machine, cause the machine(s) to wirelessly transmit power to a mobile computing device housed within a sealed product packaging to charge a battery power supply of the mobile computing device, establish a short-range wireless communication link with the mobile computing device housed within the sealed product packaging to install a firmware image on the mobile computing device, wherein the firmware image is to be selected based, at least in part, on a geographic location of the mobile computing device, and use the short-range wireless communication link to activate a wireless network interface of the mobile computing device housed within the sealed product packaging to connect to a boot server including an operating system (OS) image for the mobile computing device to download and install.

In some embodiments, the machine(s) is to further copy user data from a second mobile computing device to the mobile computing device housed within the sealed product packaging via the wireless network link. In some embodiments, the machine(s) is to further select one of a plurality of OS images based, at least in part, on the geographic location of the mobile computing device. In some of these embodiments, the OS image is selected based on a language related to the geographic location of the mobile computing device, and/or is selected based on a vendor identity associated with the geographic location of the mobile computing device. In some embodiments, the machine(s) is to further connect to a server including an OS update patch for the mobile computing device to download and install.

The invention claimed is:
1. An apparatus, comprising:
logic, at least partially implemented in hardware, to:
wirelessly transmit power to a mobile computing device housed within a sealed product packaging to charge a battery power supply of the mobile computing device;
establish a short-range wireless communication link with the mobile computing device housed within the sealed product packaging to install a firmware image on the mobile computing device, wherein the firm- ware image is to be selected based, at least in part, on a geographic location of the mobile computing device;

use the short-range wireless communication link to activate a wireless network interface of the mobile computing device housed within the sealed product packaging to connect to a boot server including an operating system (OS) image for the mobile computing device to download and install; and configure the mobile computing device to link the mobile computing device within the sealed product packaging with a second mobile computing device using the wireless network, the mobile computing device to obtain user data and user configurations from the second mobile computing device via the wireless network link to customize the mobile computing device according to user preferences.

2. The apparatus claim 1, wherein the logic is to further:
select one of a plurality of OS images based, at least in part, on the geographic location of the mobile computing device.

3. The apparatus of claim 2, wherein the OS image is selected based on a language related to the geographic location of the mobile computing device.

4. The apparatus of claim 2, wherein the OS image is selected based on a vendor identity associated with the geographic location of the mobile computing device.

5. The apparatus of claim 1, wherein the logic is to further:
connect to a server including an OS update patch for the mobile computing device to download and install.

6. The apparatus of claim 1, wherein the short-range wireless communication link comprises a Near Field Communication (NFC) link.

7. The apparatus of claim 1, wherein the short-range wireless communication link comprises a Bluetooth communication link.

8. The apparatus of claim 1, wherein the mobile computing device comprises at least one of a smartphone, a tablet computing device, or a wearable computing device.

9. A system comprising:
a processor;
a memory;
a wireless charging transmitter to wirelessly transmit power to a mobile computing device housed within a sealed product packaging to charge a battery power supply of the mobile computing device;
a short-range wireless communication interface to establish a short-range wireless communication link with the mobile computing device housed within the sealed product packaging; and
mobile computing device configuration logic to:
install a firmware image on the mobile computing device, the firmware image stored in the memory;
use the short-range wireless communication link to activate a wireless network interface of the mobile computing device housed within the sealed product packaging to connect to a boot server including an operating system (OS) image for the mobile computing device to download and install, and
configure the mobile computing device to link the mobile computing device within the sealed product packaging with a second mobile computing device using the wireless network, the mobile computing device to obtain user data and user configurations from the second mobile computing device via the wireless network link to customize the mobile computing device according to user preferences.

10. The system of claim 9, the mobile computing device configuration logic to further:
select one of a plurality of OS images based, at least in part, on a geographic location of the mobile computing device.

11. The system of claim 10, wherein the OS image is selected based on a language related to the geographic location of the mobile computing device.

12. The system of claim 10, wherein the OS image is selected based on a vendor identity associated with the geographic location of the mobile computing device.

13. The system of claim 9, the mobile computing device configuration logic to further:
configure the mobile computing device to connect to a server including an OS update patch for the mobile computing device to download and install.

14. The system of claim 9, wherein the short-range wireless communication interface comprises a Near Field Communication (NFC) interface.

15. The system of claim 9, wherein the short-range wireless communication interface comprises a Bluetooth communication interface.

16. The system of claim 9, wherein the mobile computing device to comprise at least one of a smartphone, a tablet computing device, or a wearable computing device.

17. At least one non-transitory computer readable storage medium having instructions stored thereon that, when executed on at least one machine, cause the at least one machine to:
wirelessly transmit power to a mobile computing device housed within a sealed product packaging to charge a battery power supply of the mobile computing device;
establish a short-range wireless communication link with the mobile computing device housed within the sealed product packaging to install a firmware image on the mobile computing device, wherein the firmware image is to be selected based, at least in part, on a geographic location of the mobile computing device;
use the short-range wireless communication link to activate a wireless network interface of the mobile computing device housed within the sealed product packaging to connect to a boot server including an operating system (OS) image for the mobile computing device to download and install, and
configure the mobile computing device to link the mobile computing device within the sealed product packaging with a second mobile computing device using the wireless network, the mobile computing device to obtain user data and user configurations from the second mobile computing device via the wireless network link to customize the mobile computing device according to user preferences.

18. The apparatus claim 1, wherein the user configurations include one or more of the following for the second mobile computing device:
Wi-Fi settings;
user email account settings;
user application login data; and
device home screen settings.

19. The apparatus of claim 1, wherein the user data includes one or more of the following from the second mobile computing device:
photo data;
video data; and
web browsing data.

* * * * *